(No Model.)
J. F. SANDERS & T. T. WHITCOMB.
TWO WHEELED VEHICLE.
No. 321,140. Patented June 30, 1885.
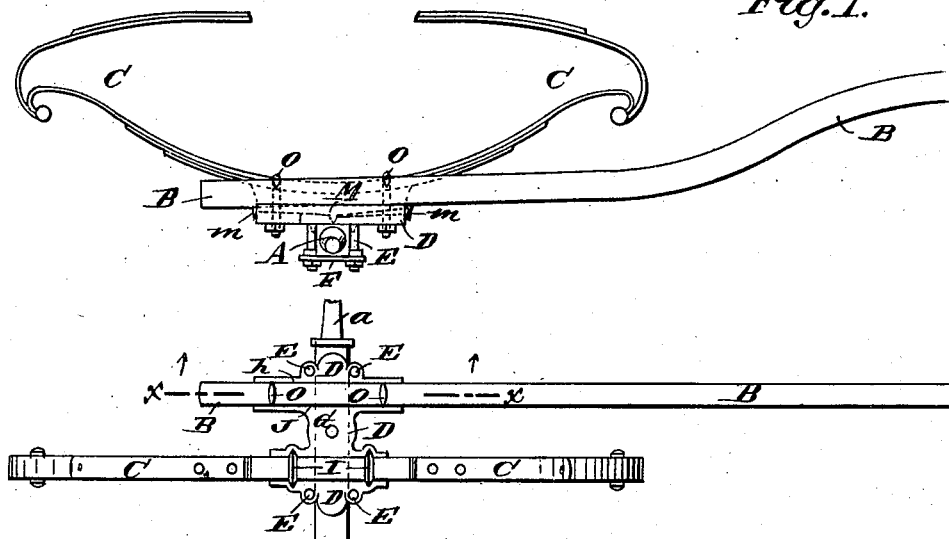
Fig. 1.
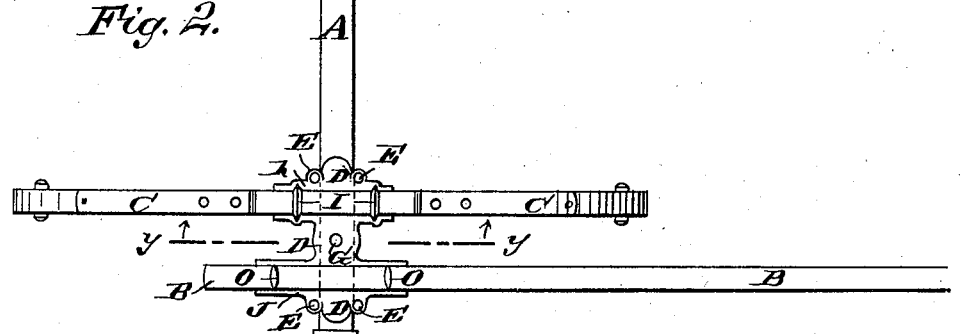
Fig. 2.
Fig. 3.
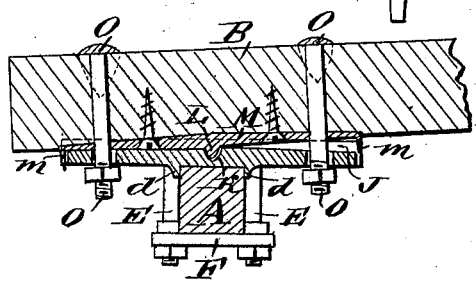
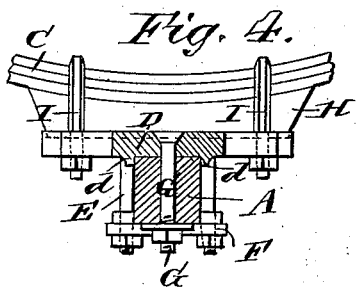
Fig. 4.
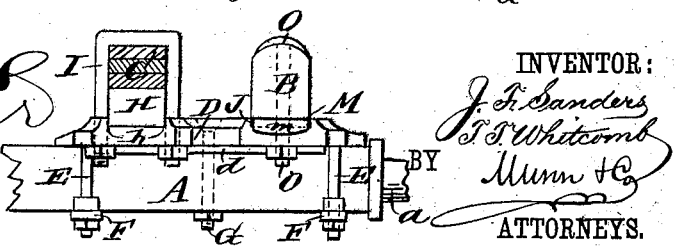
Fig. 5.
WITNESSES:
INVENTOR:
J. F. Sanders
T. T. Whitcomb
BY Munn & Co
ATTORNEYS.

UNITED STATES PATENT OFFICE.

JOSEPH F. SANDERS AND THEOPHILUS T. WHITCOMB, OF ELIZABETH CITY, NORTH CAROLINA.

TWO-WHEELED VEHICLE.

SPECIFICATION forming part of Letters Patent No. 321,140, dated June 30, 1885.

Application filed January 3, 1885. (No model.)

*To all whom it may concern:*

Be it known that we, JOSEPH F. SANDERS and THEOPHILUS T. WHITCOMB, both of Elizabeth City, in the county of Pasquotank and State of North Carolina, have invented certain new and useful Improvements in Two-Wheeled Vehicles, of which the following is a full, clear, and exact description.

Our invention relates to the running-gear of two-wheeled vehicles, and has for its object to provide a simple, inexpensive, and durable connection of the spring and shaft to the axle at each side of the vehicle, and at the same time provide for the adjustment of the outer ends of the shafts higher or lower, to suit different-sized draft-animals.

The invention consists in bed-plates fixed one at or near each end of the axle, and having grooves forming seats for the shafts, and the springs or their bed-blocks, and in a particular construction of the bed-plates and shafts, whereby the height of the shafts may be regulated at will, all as hereinafter fully described and claimed.

Reference is to be had to the accompanying drawings, forming part of this specification, in which similar letters of reference indicate corresponding parts in all the figures.

Figure 1 is a side elevation of the back ends of the shafts, and of the springs as attached to the axle of a two-wheeled vehicle. Fig. 2 is a plan view thereof. Fig. 3 is an enlarged longitudinal sectional elevation taken on the line $x\ x$, Fig. 2. Fig. 4 is a sectional elevation taken on the line $y\ y$, Fig. 2, in larger size; and Fig. 5 is a rear view of one end portion of the axle, with shaft and spring attached, the spring being in section.

The letter A indicates the axle. B B are the shafts, and C C are the springs, of a two-wheeled vehicle or road-cart, which parts may have any approved suitable construction permitting their connection by means of our improvement next described.

The letter D indicates a metal bed-plate, which preferably has ribs or lips $d\ d$ on the under side, which stand at the front and rear faces of the axle A when the plate D is secured by the clips E and their yoke-plates F, and it may be a central bolt, G, also, to the top of the axle. One plate D supports the shaft B and spring C at one side of the vehicle, a plate D being fixed to the axle at each end near the axle-arms $a\ a$, to support the opposite shafts and springs, as shown in Fig. 2. The plates D overhang the axle at front and rear where the shafts and springs rest on them, and beneath the springs C are placed the usual bed-blocks, H, which rest, by preference, in grooves or recesses $h$ of the plates, and clips I, passing over the lower leaves or sides of the springs, bind them and their bed-blocks firmly to the plates D.

Immediately under and in line with each shaft B we form in the plate D the groove or recess J, across which at the center the notch or depression K is provided, in which rests the cross rib or projection L, formed on the under side of the metal plate M, which is screwed or otherwise fastened to the under side of the shaft B, and in the preferred form has downwardly-projecting opposite end fingers, $m\ m$, which overhang the edges of the plate D at the ends of groove J, (see Figs. 3 and 5,) so as to prevent the entrance of dirt into the groove, which, if allowed, would interfere with the adjustment of the shaft.

I make the groove J with a downward slope each way from the notch K, so the shaft may rock on the rib L when the metal bolts O, which hold the shaft and its plate M to the plate D, are loosened.

It is evident that by tightening the front and rear bolts O at varying adjustments, the outer ends of the shafts may be held high or low, to suit larger or smaller horses, and without throwing the body of the vehicle out of level.

The body of the vehicle (not shown) will be connected by suitable check-straps to the shafts for sustaining the body while persons enter and leave the vehicle.

By making the bed-plate D serve as a support to the springs and shafts and as a means of connecting the springs and shafts to the axle, and by combining the shaft-regulating device with said bed-plates, we provide a simple, strong, durable, and inexpensive construction and connection of parts which present a pleasing appearance, and will bear extraordinary strains in use.

Having thus described our invention, we claim as new, and desire to secure by Letters Patent—

1. As an improvement in two-wheeled vehicles, the bed-plate D, formed in one piece and fixed to the axle to form a support to the shaft and spring at each side of the vehicle, substantially as herein set forth.

2. The combination, in a two-wheeled vehicle, of the axle A, bed-plates D, fixed thereto, the springs C, clipped to the bed-plates, and the shafts B, held adjustably by bolts O in grooves J of the bed-plates, substantially as herein set forth.

3. The combination, in a two-wheeled vehicle, of the axle A, bed-plates D, fixed thereto, the springs C, clipped to the bed-plates, and the shafts B, provided with plates M, having ribs L, and said bed-plates having grooves J, centrally notched at K, and inclining downward each way from said notches, and the bolts O, substantially as herein set forth.

4. The combination, with the bed-plate D, having a groove, J, to receive the shaft, and notched at K, of the plate M, having a rib, L, entering notch K, and provided with depending end flanges, $m\,m$, substantially as herein set forth.

5. As an improved article of manufacture, the bed-plate D, formed with the bottom ribs, $d\,d$, to embrace the axle, the upper groove, $h$, to receive the spring or its bed-block, and the upper groove, J, inclined downward toward each end, from a central notch, K, to receive the shaft, substantially as herein set forth.

JOSEPH F. SANDERS.
THEOPHILUS T. WHITCOMB.

Witnesses:
MAURICE WESCOTT,
HENRY C. MEADS.